United States Patent
Zhang

(10) Patent No.: US 11,327,022 B2
(45) Date of Patent: May 10, 2022

(54) ACCESSORIES FOR RAMAN AND LUMINESCENCE SPECTRAL ACQUISITIONS

(71) Applicant: Dongmao Zhang, Starkville, MS (US)

(72) Inventor: Dongmao Zhang, Starkville, MS (US)

(*) Notice: Subject to any disclaimer, the term of this patent is extended or adjusted under 35 U.S.C. 154(b) by 0 days.

(21) Appl. No.: 16/488,294

(22) PCT Filed: Feb. 24, 2018

(86) PCT No.: PCT/US2018/019600
§ 371 (c)(1),
(2) Date: Aug. 23, 2019

(87) PCT Pub. No.: WO2018/157012
PCT Pub. Date: Aug. 30, 2018

(65) Prior Publication Data
US 2020/0011803 A1    Jan. 9, 2020

Related U.S. Application Data

(60) Provisional application No. 62/463,480, filed on Feb. 24, 2017.

(51) Int. Cl.
| | | |
|---|---|---|
| G01N 21/65 | (2006.01) |
| B01L 3/00 | (2006.01) |
| G01J 3/02 | (2006.01) |
| G01N 21/03 | (2006.01) |

(52) U.S. Cl.
CPC ............ *G01N 21/65* (2013.01); *B01L 3/508* (2013.01); *G01J 3/02* (2013.01); *B01L 2300/168* (2013.01); *G01N 2021/0357* (2013.01); *G01N 2021/651* (2013.01)

(58) Field of Classification Search
CPC ......... G01N 33/54306; G01N 33/5014; G01N 33/54373; G01N 33/6848; G01N 33/54393; G01N 21/645; G01N 21/00303; G01N 21/1717; G01N 21/3103; C23C 16/403; C23C 16/405; C23C 16/401; C23C 16/56; C12Q 1/6837; C12Q 1/686; B01L 2300/0829; B01L 2300/0887; B01L 3/5025; B01L 3/5085
USPC ............... 356/244, 246, 335–343, 432–440, 356/300–301, 319, 326; 422/58, 102; 506/503, 9, 18
See application file for complete search history.

(56) References Cited

U.S. PATENT DOCUMENTS

| | | | |
|---|---|---|---|
| 2005/0142033 A1* | 6/2005 | Glezer ................... | G01N 21/66 422/400 |
| 2005/0173632 A1* | 8/2005 | Behar .................... | H01J 37/20 250/311 |
| 2010/0022416 A1* | 1/2010 | Flemming ............. | B01L 3/5085 506/39 |
| 2011/0257040 A1* | 10/2011 | Turner .................. | B01J 19/0046 506/16 |

(Continued)

*Primary Examiner* — Hoa Q Pham
(74) *Attorney, Agent, or Firm* — Conley Rose, P.C.

(57) ABSTRACT

The present invention provides for a novel series of accessories for Raman and/or luminescence spectral acquisitions for many different applications and methods for making such accessories. The invention further provides sample holders that enhance sample handling ability and sample sensitivity, reduce fluorescence and Raman background, as well as sample size and consumption, and thereby improve resulting spectral analyses.

20 Claims, 5 Drawing Sheets

(56) References Cited

U.S. PATENT DOCUMENTS

| | | | | |
|---|---|---|---|---|
| 2014/0323330 A1* | 10/2014 | Bergo | ............... | G01N 33/54373 |
| | | | | 506/9 |
| 2015/0369803 A1* | 12/2015 | Katsir | ................... | C23C 16/405 |
| | | | | 506/16 |
| 2017/0333905 A1* | 11/2017 | Fuhr | ......................... | B01L 7/54 |
| 2020/0095629 A1* | 3/2020 | Chou | ........................ | B01L 7/52 |

\* cited by examiner

ACCESSORIES FOR RAMAN AND LUMINESCENCE SPECTRAL ACQUISITIONS

CROSS-REFERENCE TO RELATED APPLICATION

This application claims priority from U.S. Provisional Patent Application Ser. No. 62/463,480 filed Feb. 24, 2017. The entirety of the provisional application is incorporated herein by reference.

STATEMENT OF GOVERNMENT SUPPORT

This invention was made with government support under Career Award Grant CHE 1151057 awarded by the National Science Foundation. The government has certain rights in the invention.

FIELD OF THE INVENTION

This invention relates to the field of spectroscopy and, more particularly, to Raman and luminescence spectroscopy. Specifically, the invention involves a novel series of accessories for Raman and/or luminescence spectral acquisitions for many different applications. The invention provides sample holders that enhance sample handling ability and sample sensitivity and reduce sample consumption, thereby improving spectral analyses.

BACKGROUND OF THE INVENTION

The present invention provides for new accessories to enhance Raman and luminescence spectroscopic analyses. Current holder techniques involve a lack of suitable sample handling techniques, typically a large sample size, high cost, and results that complicate the spectral analysis itself. The invention discloses a series of accessories that provides effective and efficient solutions to these and other ineffective characteristics of the current methodologies.

The present invention provides for resolutions to the problems associated with current spectral analysis holders/techniques and is applicable in multiple spectroscopic fields and in many different applications.

SUMMARY OF THE INVENTION

The present invention provides novel accessories for Raman and/or luminescence spectral acquisitions and methods for making such accessories. The sample holders of the invention provide enhanced ability for handling samples and enhanced sensitivity, as well as reducing sample size and consumption and holder cost. As a result, the Raman and luminescence spectral analyses results are enhanced.

With the foregoing and other objects, features, and advantages of the present invention that will become apparent hereinafter, the nature of the invention may be more clearly understood by reference to the following detailed description of the preferred embodiments of the invention and to the appended claims.

BRIEF DESCRIPTION OF THE DRAWINGS

These drawings accompany the detailed description of the invention and are intended to illustrate further the invention and its advantages. The drawings, which are incorporated in and form a portion of the specification, illustrate certain preferred embodiments of the invention and, together with the entire specification, are meant to explain preferred embodiments of the present invention to those skilled in the art. Relevant FIGURES are shown or described in the Detailed Description of the Invention as follows.

DETAILED DESCRIPTION OF THE INVENTION

Figure 1:
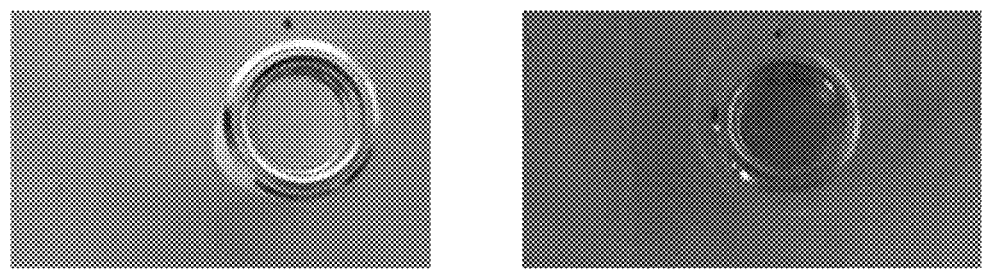
FIG. 1 shows a view of an example sample cup without an optically transparent cover (left) and sample cup with an optically transparent cover (right).
Figure 2:
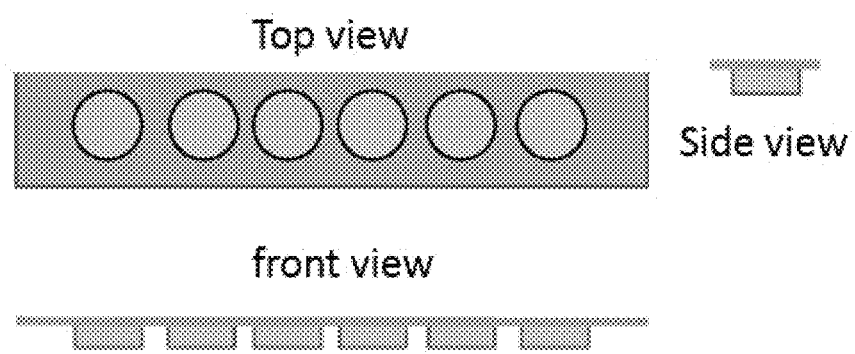
FIG. 2 shows a pictorial representation of the top, front, and side views of one example design of a sample cup array of the present invention.

The present invention provides for a novel series of accessories for Raman and/or luminescence spectroscopy acquisitions that enhance the quality of such spectral analyses and results and methods for making such accessories. The novel accessories of the invention include sample cups, cup array(s), well plate(s), and planar sample holders. A sample cup refers to a small open sample container that can be optionally covered by a cover having an optically transparent window. The transparent window can be, but is not limited to, a quartz, $MgF_2$, or $CaF_2$ optical window, for example, with a thickness in the range of from about 10 μm to about 2 mm. The cover may be fixed or removable and may be a sealing or non-sealing cover. The cover can prevent or minimize solvent evaporation. Further, the cover prevents or minimizes ambient vibration, solvent vibration, and/or chemical reaction with ambient molecules. An example sample cup with and without such a cover is shown in FIG. 1 (right view and left view, respectively). A cup array refers to a series of cups placed in a holder of cups wherein the individual cups can be replaced or permanently attached with or to the holder. FIG. 2 is a view of the top, front, and side views of one example design of such a sample cup array of the present invention. The length and width of the cup array can be the same as for a standard microscope slide, for example. A well plate is a flat plate that looks like a tray with one or more wells that are used as small sample containers. The terms sample cup and sample well, and the terms cup array and well plate, can be used interchangeably. 'Well' and 'well plate' are terms more frequently used by biologists and biochemists, while the terms 'sample cup' and 'cup array' are more common terms used by analytical and physical chemists.

The sample holders of the invention facilitate sample cup usage in practical spectroscopic applications. These novel holders can be made with any material that can hold one or multiple sample cups. The accessories of the invention provide for control of the sample handling methods, enhanced sensitivity and spectral analysis results (reduced fluorescence and/or Raman background), reduced sample consumption, more efficient sample size, and lower holder cost. The accessories can be customized for multiple specific applications.

This invention enhances both Raman and luminescence spectral acquisitions. Herein, the term "Raman" includes, but is not limited to, spontaneous Raman, stimulated Raman, coherent anti-stoke resonance Raman, surface enhanced Raman, resonance Raman, and surface enhanced resonance Raman spectroscopy. The term "luminescence" includes, but is not limited to, chemical, biochemical, and electroluminescence. Raman and luminescence spectroscopies are popular analytical techniques that have found applications in essentially every physical and biological science and engineering discipline. However, the sensitivity of Raman techniques suffers from a lack of suitable sample handling methods. Existing sample holders include glass vials, quartz plate, optical windows, and the like. These sample holders usually produce large fluorescence and/or Raman background that complicates the Raman spectral analysis and results. In addition, current sample holders/substrates usually require large sample size(s). Moreover, current sample holders (especially quartz and optical windows) are very costly. The series of accessories disclosed herein provides efficient and effective solutions to those problems and issues. The novel accessories of the invention are applicable for enhancing the sensitivity and reducing the sample consumption in both Raman and luminescence analyses.

EXAMPLE #1

Metal Sample Cups, Cup Array, and Well Plates

Figure 3:
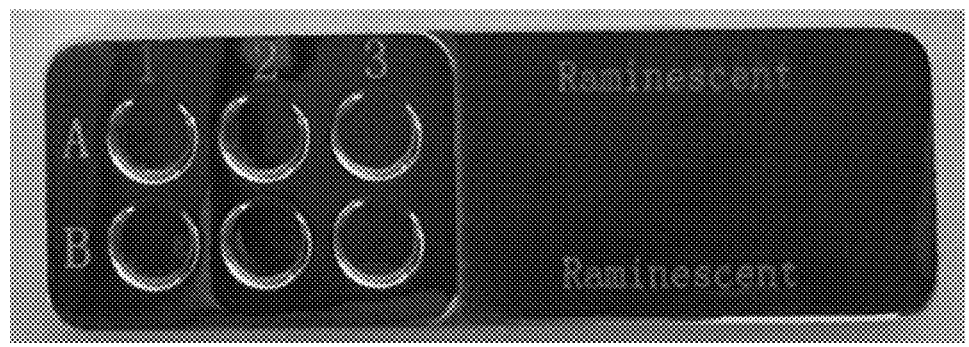
FIG. 3 shows a pictorial representation of an example of a metal sample well plate made with mirror-finished stainless steel.

The accessories that include the metal sample cups, cup array, and well plates of the present invention can be made directly using pure metal and/or metal alloy, for example, or indirectly by applying a metal coating of the pure metal or metal alloy onto at least one nonmetal solid support. These coating methods include, but are not limited to, physical vapor deposition, chemical/electrochemical plating, and/or mechanical lamination methods. The metal can include, but is not limited to, stainless steel, aluminum, silver, gold, copper, or a combination thereof, for example. The nonmetal solid support(s) for the metal coating include, but are not limited to, glass, plastic, or a combination, or other material to which metal can be attached. FIG. 3 shows an example of a metal sample well plate of the invention made with mirror-finished stainless steel. The shapes of the cups or wells may be uniform or non-uniform and include, but are not limited to, circular, square, rectangular, and irregular shapes, for example. The surface areas of the well cross-sections, which may also be uniform or non-uniform, may range from about 0.01 mm$^2$ to about 16 cm$^2$. The depth of the wells may range from about 1 μm to about 1 cm. The metal surfaces are preferably flat and reflective. The reflective surfaces enhance the photon excitation and collections.

EXAMPLE #2

Metal Sample Cups with a Dielectric Overlayer

Another embodiment of the sample cups of the invention is achieved by coating the metal or metal alloy cups disclosed in Example #1 with at least one thin layer of a dielectric material. The dielectric material may include, but is not limited to, glass, alumina, silicon oxide, or a combination thereof, for example. The thickness of the dielectric material layer can range from about 10 nanometers (nm) to about 1 millimeter (mm). The coating layer is preferably transparent and with a thickness of below about 200 micrometers (μm). The transparency enhances excitation and detection. The small thickness is to reduce the spectroscopic background signal from the coating dielectric layer. The purpose of such coating(s) includes, but is not limited to, preventing or minimizing the physical and/or chemical interactions between the metal and the sample. The dielectric layer provides a convenient way for one to optionally chemically modify the cup surface for applications such as antibody-antigen binding, for example. One example of chemical modification is to use the established silicon oxide surface chemistry to make the cup hydrophobic, hydrophilic, and/or to possess other functionalities for targeted applications.

EXAMPLE #3

Quartz Cup, Cup Array, and Quartz Well Plates with Reflective Metal Coating

Another embodiment of the sample cup, cup array, and well plates of the invention are quartz coated with a reflective metal coating at a portion of or at the entire outside surface of the quartz well(s). The thickness of the bottom of the quartz well ranges from about 10 μm to about 2 mm. This reflective metal coating can be a single layer or multiple layers using metals that include, but are not limited to, silver, gold, aluminum, copper, stainless steel, chromium, or a combination thereof, for example. The quartz surface can be advantageously polished prior to metal coating. A prototype metal coated quartz well plate and three example quartz wells are shown in FIG. 4.

Figure 4:
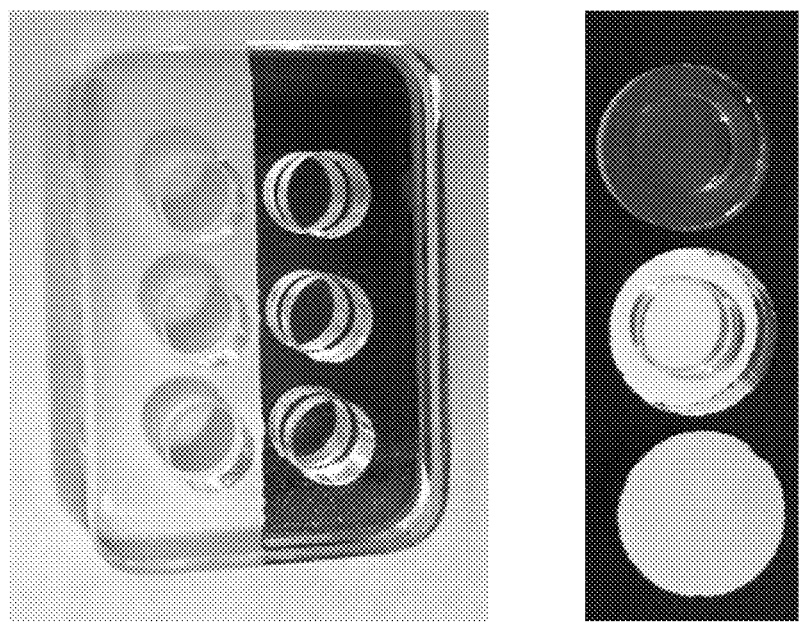
FIG. 4 shows a pictorial representation of an example of a prototype metal coated quartz well plate and three sets of three example quartz wells.

FIG. 4 shows an example quartz well plate (left view). The three wells on the left-hand side are transparent without metal coating outside of the bottom surface. The outside bottom surfaces of the three wells on the right-hand side are coated sequentially with a thin layer of silver and gold. The right view of FIG. 4 shows a single quartz sample cup. The top cup is a quartz sample well without reflective coating. The middle cup is coated sequentially with silver and gold on the bottom quartz surface. The bottom cup is an image of an inverted metal-coated quartz well.

EXAMPLE #4

Sample Cups with Deposited Silver and/or Gold Nanoparticles (AgNPs, AuNPs) for Surface Enhanced Raman & Illuminescence Measurements Still another embodiment of the sample cups of the invention is achieved by depositing silver and/or gold nanoparticles onto the sample cups disclosed in Examples #1, #2, and/or #3. The methods for the silver/gold nanoparticle deposition include, but are not limited to, the following:
1) Physical vapor deposition (PVD): Evaporating a semi-continuous silver and/or gold film onto the naked metal surfaces, dielectrically-coated metal surfaces, or the quartz surfaces. The nominal average thickness of the coating ranges from about 5 nanometers (nm) to about 1 micrometer (μm).
2) Deposition of preformed silver (Ag) nanoparticles (NPs) and/or gold (Au) nanoparticles (NPs) onto the naked metal surfaces, dielectrically-coated metal surfaces, or the quartz surfaces.

EXAMPLE #5

Reflective Planar Sample Holder

Figure 5:
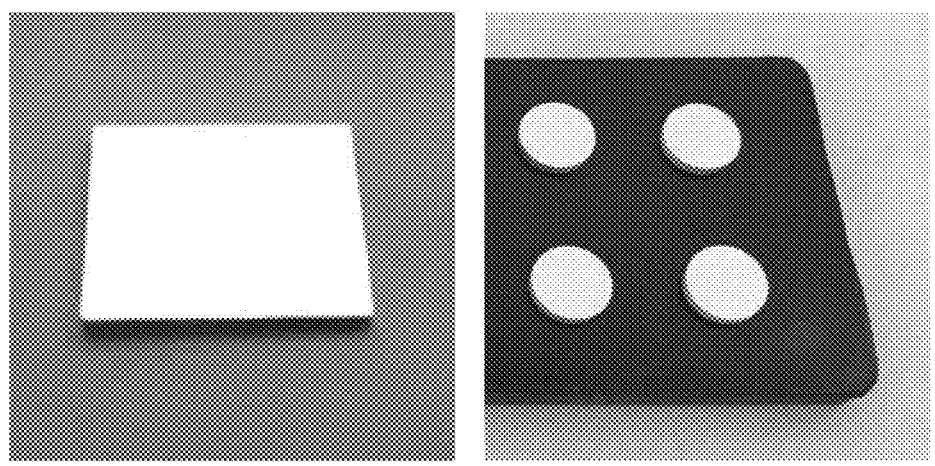
FIG. 5 shows a pictorial representation of an example of a reflective planar sample holder made with glass sequentially coated with chromium, silver, and silica oxide.

Another embodiment of the invention is a reflective planar sample holder comprised of a reflective planar metal surface or a metal modified surface sample cup and wherein the metal surface or metal modified surface is made of polished stainless steel, glass coated with metals including, but not limited to, silver, gold, aluminum, or combinations thereof, for example. The reflective planar metal surface or metal modified surface can be optionally coated with a single layer or multiple layers of materials that include, but are not limited to, a silicon oxide, alumina, a polymer such as polytetrafluoroethylene (PTFE) for example, or a combination thereof. The thickness of the coating layer varies from about 2 nanometers to about 100 μm. One example of the reflective planar sample holder of the invention made with glass that is sequentially coated with chromium, silver, and silicon oxide is shown in FIG. 5.

All parameters presented herein including, but not limited to, sizes, dimensions, times, temperatures, pressures, amounts, distances, quantities, ratios, weights, volumes, percentages, and/or similar features and data and the like, for example, presented herein represent approximate values and can vary with the possible embodiments described and those not necessarily described but encompassed by the invention. Further, references to 'a' or 'an' concerning any particular item, component, material, or product is defined as at least one and could be more than one.

The above detailed description is presented to enable any person skilled in the art to make and use the invention. Specific details have been revealed to provide a comprehensive understanding of the present invention and are used for explanation of the information provided. These specific details, however, are not required to practice the invention, as is apparent to one skilled in the art. Descriptions of specific applications, analyses, materials, components, dimensions, and calculations are meant to serve only as representative examples. Various modifications to the preferred embodiments may be readily apparent to one skilled in the art, and the general principles defined herein may be applicable to other embodiments and applications while still remaining within the scope of the invention. There is no intention for the present invention to be limited to the embodiments shown and the invention is to be accorded the widest possible scope consistent with the principles and features disclosed herein.

While various embodiments of the present invention have been described above and in the attached documents, it should be understood that they have been presented by way of example and not limitation. It will be apparent to persons skilled in the relevant art(s) that various changes in form and detail can be made therein without departing from the spirit and scope of the present invention. In fact, after reading the above description, it will be apparent to one skilled in the relevant art(s) how to implement the invention in alternative embodiments. The applicant has described the preferred embodiments of the invention, but it should be understood that the broadest scope of the invention includes such modifications as additional or different methods and materials. Many other advantages of the invention will be apparent to those skilled in the art from the above descriptions and the subsequent claims. Thus, the present invention should not be limited by any of the above-described exemplary embodiments.

The compositions, processes, products, apparatus, systems, and methods of the present invention are often best practiced by empirically determining the appropriate values of the operating parameters or by conducting simulations to arrive at best design for a given application. Accordingly, all suitable modifications, combinations, and equivalents should be considered as falling within the spirit and scope of the invention.

What is claimed is:

1. An accessory for obtaining spectroscopy samples and reducing fluorescence and/or Raman background, the accessory comprising at least one holder for a spectral analysis sample, wherein the holder is a pure metal or metal alloy sample cup or metal sample cup formed by applying a metal coating to a nonmetal support, wherein a metal or metal alloy surface is reflective and enhances photon excitation and collection and spectral analysis results, wherein a well of the cup has a cross-section surface area range of from about 0.01 square millimeters to about 16 square centimeters and a depth of from about 1 micrometer to about 1 centimeter and the metal coating is coated with a transparent dielectric material having a thickness range of from about 10 nanometers to about 1 millimeter for enhancing excitation and detection of the samples and to reduce spectroscopic background signals and minimize metal and sample interactions, and wherein the pure metal or metal alloy sample cup surface or a dielectrically-coated metal surface, or both, is coated with nanoparticles of silver, gold, or a combination thereof, having a thickness range of from about 5 nanometers to about 1 micrometer.

2. The accessory of claim 1, wherein the holder comprises a cup array of more than one metal or metal alloy sample cup or a well plate having more than one metal or metal alloy sample cup and wherein the metal is stainless steel, aluminum, silver, gold, copper, or a combination thereof.

3. The accessory of claim 2, wherein the holder is a quartz sample cup having a reflective metal coating at a portion of or at an entire outside surface of the well and wherein the reflective metal coating has a thickness range at a bottom of the well of the cup of from about 10 micrometers to about 2 millimeters and a quartz-coated surface is coated with nanoparticles of silver, gold, or a combination thereof, having a thickness range of from about 5 nanometers to about 1 micrometer.

4. The accessory of claim 3, wherein the holder is a quartz sample cup array of more than one quartz sample cup with reflective metal coating or a quartz well plate having more than one quartz well with reflective metal coating and wherein the reflective metal coating comprises one or more layers of silver, gold, aluminum, copper, stainless steel, chromium, or a combination thereof.

5. The accessory of claim 4, wherein the metal, metal alloy, or quartz sample cup is overlaid with silver nanoparticles, gold nanoparticles, or a combination thereof.

6. The accessory of claim 5, wherein the nanoparticles are deposited onto the sample cup by physical vapor deposition (PVD) or by deposition of preformed silver nanoparticles, gold nanoparticles, or a combination thereof, onto the metal, metal alloy, or quartz surface of the sample cup.

7. The accessory of claim 2, wherein the metal or metal alloy sample cup is overlaid with a dielectric material to prevent or minimize physical interaction, chemical interaction, or both, between the metal or metal alloy and the sample.

8. The accessory of claim 7, wherein the dielectric material is glass, alumina, silica, or a combination thereof.

9. The accessory of claim 7, wherein the metal, metal alloy, or quartz sample cup and dielectric material are overlaid with silver nanoparticles, gold nanoparticles, or a combination thereof.

10. The accessory of claim 9, wherein the nanoparticles are deposited onto the sample cup and dielectric material by physical vapor deposition (PVD) or by deposition of preformed silver nanoparticles, gold nanoparticles, or both, onto the metal or metal alloy surface or the dielectrically-coated metal surface of the sample cup.

11. The accessory of claim 10, wherein the sample cup has a fixed or removable cover having an optically transparent.

12. The accessory of claim 1, wherein the holder is a reflective planar metal surface or metal modified surface sample cup and wherein the metal surface or metal modified surface is stainless steel and coated with glass coated with silver, gold, aluminum, or a combination thereof, and coated with one or more layers of a silicon oxide, alumina, a polymer, or a combination thereof.

13. A method for making an accessory for obtaining spectroscopy samples wherein the accessory comprises a sample cup, cup array, or well plate for enhancing spectral analyses results, the method comprising:
    forming the sample cup, cup array, or well plate from metal or by applying a metal coating onto a nonmetal solid support by physical vapor deposition, chemical plating, electrochemical plating, mechanical lamination, or a combination thereof, wherein a well of the cup has a cross-section surface area range of from about 0.01 square millimeters to about 16 square centimeters and a depth of from about 1 micrometer to about 1 centimeter;
    coating the metal coating with a transparent dielectric material having a thickness range of from about 10 nanometers to about 1 millimeter for enhancing excitation and detection of the samples and to reduce spectroscopic background signals and minimize metal and sample interactions; and
    coating a metal sample cup surface or a dielectrically-coated metal surface. or both. with nanoparticles of silver, gold, or a combination thereof having a thickness range of from about 5 nanometers to about 1 micrometer.

14. The method of claim 13, wherein the metal is pure metal comprised of stainless steel, aluminum, silver, gold, or copper, or a metal alloy comprised of a combination of stainless steel, aluminum, silver, gold, or copper, and the nonmetal solid support is comprised of glass, plastic, a material to which metal can be attached, or a combination thereof.

15. The method of claim 14, wherein surfaces of the pure metal or metal alloy are reflective.

16. The method of claim 14, further comprising coating the sample cup, cup array, or well plate with a dielectric material to prevent physical, chemical, or both, interactions between the metal and the sample.

17. The method of claim 16, further comprising depositing silver nanoparticles, gold nanoparticles, or a combination thereof, on the sample cup, cup array, or well plate comprised of pure metal or metal alloy, or on the sample cup, cup array, or well plate comprised of pure metal or metal alloy with a dielectric material coatin wherein the nanoparticles have a thickness range of from about 5 nanometers to about 1 micrometer.

18. The method of claim 14, wherein the sample cup, cup array, or well plate is quartz coated thereby providing a quartz surface that is coated with a reflective metal coating at a portion of or at an entire outside surface of the well and wherein the reflective metal coating is comprised of one or more layers of silver, gold, aluminum, copper, stainless steel, chromium, or a combination thereof and wherein the reflective metal coating has a thickness range at a bottom of the well of the cup of from about 10 micrometers to about 2 millimeters, and further comprising coating a quartz-coated surface with nanoparticles of silver, gold, or a combination thereof having a thickness range of from about 5 nanometers to about 1 micrometer.

19. The method of claim 18, wherein quartz surface is polished prior to metal coating.

20. The method of claim 13, further comprising forming a reflective planar sample holder comprised of a reflective planar metal surface or metal modified surface sample cup, wherein the metal surface or the metal modified surface, or both, is coated with one or more layers of silicon oxide, alumina, a polymer, or a combination thereof.

* * * * *